(12) United States Patent
Konicek et al.

(10) Patent No.: US 11,148,821 B2
(45) Date of Patent: Oct. 19, 2021

(54) MOTION LIMITER FOR RAM AIR TURBINE (RAT) DOOR LINKAGE

(71) Applicant: Hamilton Sundstrand Corporation, Charlotte, NC (US)

(72) Inventors: Timothy Scott Konicek, Rockford, IL (US); Stuart T. Gerger, Madison, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 393 days.

(21) Appl. No.: 16/288,913

(22) Filed: Feb. 28, 2019

(65) Prior Publication Data
US 2020/0277077 A1 Sep. 3, 2020

(51) Int. Cl.
*B64D 35/00* (2006.01)
*F16H 21/44* (2006.01)

(52) U.S. Cl.
CPC ............. *B64D 35/00* (2013.01); *F16H 21/44* (2013.01)

(58) Field of Classification Search
CPC ................................ B64D 35/00; F16H 21/44
See application file for complete search history.

(56) References Cited

U.S. PATENT DOCUMENTS

| | | | |
|---|---|---|---|
| 1,059,504 A | 4/1913 | Teppert | |
| 4,498,647 A | 2/1985 | Boehringer | |
| 5,120,195 A * | 6/1992 | Schmaling | B64C 27/35 416/134 A |
| 6,679,333 B2 * | 1/2004 | York | E21B 19/084 166/379 |
| 6,832,658 B2 * | 12/2004 | Keast | E21B 3/02 166/77.52 |
| D768,471 S * | 10/2016 | Marquez | D8/382 |
| 9,556,690 B1 * | 1/2017 | Marquez | F16C 11/045 |
| 9,847,146 B2 * | 12/2017 | Kang | G21C 13/024 |
| 10,954,753 B2 * | 3/2021 | Fuehring | E21B 3/02 |
| 10,982,711 B2 * | 4/2021 | Slack | E21B 19/06 |
| 2013/0105168 A1 * | 5/2013 | Overland | E21B 19/07 166/352 |
| 2013/0202346 A1 * | 8/2013 | Hodging | F16C 11/045 403/113 |
| 2013/0233967 A1 * | 9/2013 | Salthouse | B64C 9/22 244/99.3 |
| 2015/0096437 A1 | 4/2015 | Russ | |

FOREIGN PATENT DOCUMENTS

| | | |
|---|---|---|
| EP | 0483049 A1 | 4/1992 |
| EP | 3179117 A1 | 6/2017 |

OTHER PUBLICATIONS

European Search Report; Application No. 19210209.3-1010; dated Jun. 26, 2020; 7 pages.

* cited by examiner

*Primary Examiner* — David M Fenstermacher
(74) *Attorney, Agent, or Firm* — Cantor Colburn LLP (57) ABSTRACT

Disclosed is an aircraft system comprising: a linkage comprising a first end, an opposing second end and a clevis therebetween; a motion limiter configured to engage the clevis; wherein: the first end is configured for connecting to one of a strut of a ram air turbine (RAT) and an enclosure door, and the second end is configured for connecting with another of the strut and the door; and the motion limiter limits rotation between the first end of the linkage and the second end of the linkage.

18 Claims, 7 Drawing Sheets

MOTION LIMITER FOR RAM AIR TURBINE (RAT) DOOR LINKAGE

BACKGROUND

The present disclosure is related to aircraft systems and more specifically to a motion limiter for a ram air turbine (RAT) door linkage to prevent damage from over-rotation.

A RAT is utilized on numerous aircraft to provide hydraulic and/or electrical power in emergency situations. The air stream acts on the RAT blades to spin the turbine and governor assembly, which in turn operates an electrical generator and/or a hydraulic pump to provide power to the aircraft.

The RAT is stowed in the aircraft structure and deployed into the air stream by a deployment actuator. The deployment actuator is attached to aircraft structure and to an arm on the strut of the RAT. On deployment, the deployment actuator forces the RAT to rotate out of its stowed, or retracted, position in the aircraft and into the air stream. The RAT is held in the aircraft by an up-lock mechanism and is restrained in the deployed position by a down-lock mechanism, both of which are contained within the deployment actuator. Deployment of the RAT facilitates opening of an associated door or hatch in the aircraft's fuselage, typically by use of a linkage arm connected to both the door and the strut for the RAT.

BRIEF DESCRIPTION

Disclosed is an aircraft system comprising: a linkage comprising a first end, an opposing second end and a clevis therebetween; a motion limiter configured to engage the clevis; wherein: the first end is configured for connecting to one of a strut of a ram air turbine (RAT) and an enclosure door, and the second end being is configured for connecting with another of the strut and the door; and the motion limiter limits rotation between the first end of the linkage and the second end of the linkage.

In addition to one or more of the above disclosed features, or as an alternate, the first end of the linkage is a proximate end, and the second end of the linkage is a distal end; a first portion of the linkage extends between the clevis and the first end, and includes a clevis base, distally extending clevis prongs, a clevis cavity defined between the clevis prongs, and a clevis cavity apex at a proximate end of the clevis cavity; and a second portion of the linkage extends between the clevis and the second end, and includes a clevis tang; and the motion limiter engages the clevis cavity apex to limit rotation of the clevis tang within the clevis cavity.

In addition to one or more of the above disclosed features, or as an alternate, the motion limiter comprises a block, the block including a first opening; and the block is configured for sliding over the prongs so that the prongs pass through the first opening and the block engages the clevis cavity apex.

In addition to one or more of the above disclosed features, or as an alternate, the system includes two openings including the first opening; wherein each of the two openings is configured for sliding over a respective one of the clevis prongs.

In addition to one or more of the above disclosed features, or as an alternate, each of the openings has an inner surface profile that matches an outer surface profile of a respective one of the clevis prongs.

In addition to one or more of the above disclosed features, or as an alternate, a block web is formed in a separation between the two openings, and the block web engages the clevis cavity apex.

In addition to one or more of the above disclosed features, or as an alternate, the motion limiter comprises a block, and the block includes: a distal side that is positioned against a proximate side of the clevis base, the distal side including an opening configured for surrounding a first segment of the first portion of the linkage that is between the clevis and the first end; and a first side surface and a first tab that extends distally from the first side surface to engage the clevis cavity apex.

In addition to one or more of the above disclosed features, or as an alternate, the first tab is L-shaped and has a first leg that extends distally from the first side surface of the block and a second leg that extends perpendicularly to the first leg so that the second leg extends into the clevis cavity.

In addition to one or more of the above disclosed features, or as an alternate, the block further comprises: a first pair of opposing side surfaces that includes the first side surface; and a pair of tabs that includes the first tab; wherein each of the tabs extends distally from a respective one of the first pair of opposing side surfaces of the block so that each of the tabs engages the clevis cavity apex.

In addition to one or more of the above disclosed features, or as an alternate, the block includes a second side surface, and a first support flange that extends distally from the second side surface for engaging one of the clevis prongs.

In addition to one or more of the above disclosed features, or as an alternate, the block further comprises: a second pair of opposing side surfaces that includes the second side surface; and a first pair of support flanges that includes the first support flange; wherein each of the flanges extends distally from a respective one of the second pair of opposing side surfaces, so that each of the flanges engages a respective one of the clevis prongs.

In addition to one or more of the above disclosed features, or as an alternate, each of the flanges engages the respective one of the clevis prongs by being positioned against an exterior surface of the respective one of the respective clevis prongs.

In addition to one or more of the above disclosed features, or as an alternate, the first segment of the first portion of the linkage is a bushing that is configured for being positioned within a channel in a strut for the RAT, and the first opening has an arcuate inner surface profile for surrounding the bushing.

In addition to one or more of the above disclosed features, or as an alternate, the block is segmented into at least two pieces and the at least two pieces are held together by a connector that extends about an outer surface of the block.

In addition to one or more of the above disclosed features, or as an alternate, each of the at least two pieces has a same shape.

In addition to one or more of the above disclosed features, or as an alternate, the connector is frangible.

In addition to one or more of the above disclosed features, or as an alternate, the connector includes a plurality of frangible connectors distributed about the block.

Further disclosed is a method of configuring an aircraft system, comprising: obtaining a linkage for linking a ram air turbine (RAT) with a door for enclosing the RAT in an aircraft, wherein a first portion of the linkage is configured to be on a proximate side of a clevis and a second portion of the linkage is configured to be on a distal side of the clevis, and wherein the first portion and the second portion are disconnected from each other; obtaining a motion limiter for limiting relative rotation between the first portion and the second portion; sliding the motion limiter over clevis prongs formed on one of the first portion and the second portion until a block web of the motion limiter engages a clevis cavity apex formed between the clevis prongs; and connecting the first portion to the second portion so that a clevis tang formed on another of the first portion and the second portion is rotationally connected to the clevis prongs.

Further disclosed is a method of configuring an aircraft system, comprising: obtaining a linkage for linking a ram air turbine (RAT) with a door for enclosing the RAT in an aircraft, wherein a first portion of the linkage is configured to be on a proximate side of a clevis and a second portion of the linkage is configured to be on a distal side of the clevis, and wherein the first portion and the second portion are connected to each other; obtaining a motion limiter for limiting relative rotation between the first portion and the second portion, the motion limiter comprising a plurality of same pieces; and assembling the plurality of pieces around the linkage to form the motion limiter having a single opening formed around a bushing in the linkage, and so that at least one tab extending from the motion limiter engages a clevis cavity formed between clevis prongs of the clevis.

In addition to one or more of the above disclosed features, or as an alternate, the method includes tying the assembled plurality of pieces together with at least one connector and thereafter removing the at least one connector to disassemble the plurality of pieces and remove the motion limiter from the linkage.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
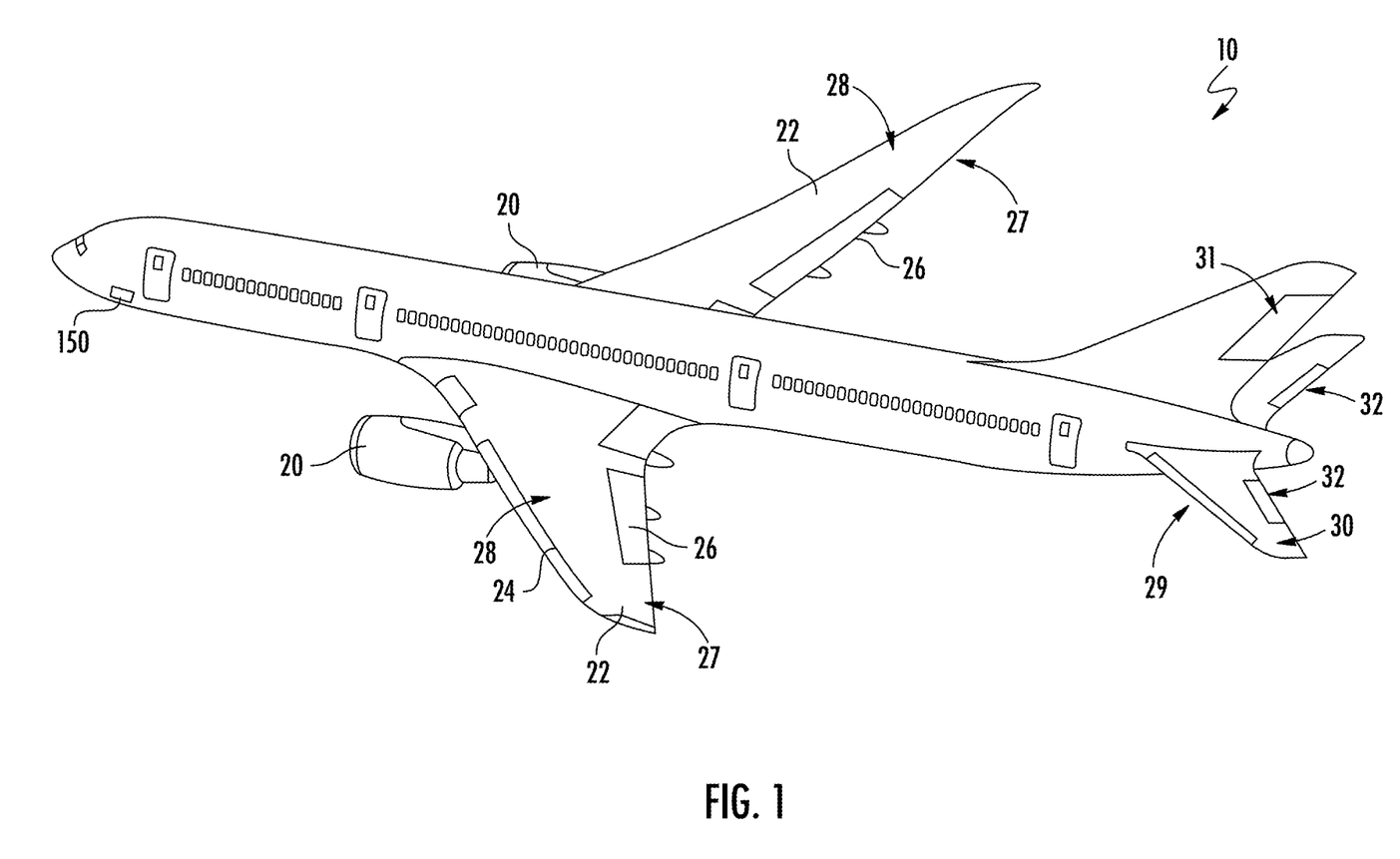
FIG. 1 is a perspective view of an aircraft where embodiments of the present invention can be implemented.

Turning to FIGS. 1-10, an aircraft and components thereof are disclosed in which embodiments of the present invention can be implemented. FIG. 1 illustrates an example of a commercial aircraft 10 having aircraft engines surrounded by (or otherwise carried in) a nacelles 20 housing therein a gas turbine engine. The aircraft 10 includes two wings 22 that can each include one or more slats 24 and one or more flaps 26. The aircraft may further include ailerons 27, spoilers 28, horizontal stabilizer trim tabs 29, horizontal stabilizer 30 and rudder 31, and elevators 32 (the tail structure being collectively referred to as an empennage) each of which may be typically referred to as "control surfaces" as they are movable under aircraft power systems. A door 150 is illustrated for enclosing an aircraft compartment that contains a ram air turbine (RAT), wherein the RAT and the connection between the door 150 and the RAT are disclosed in greater detail below.

Figure 2:
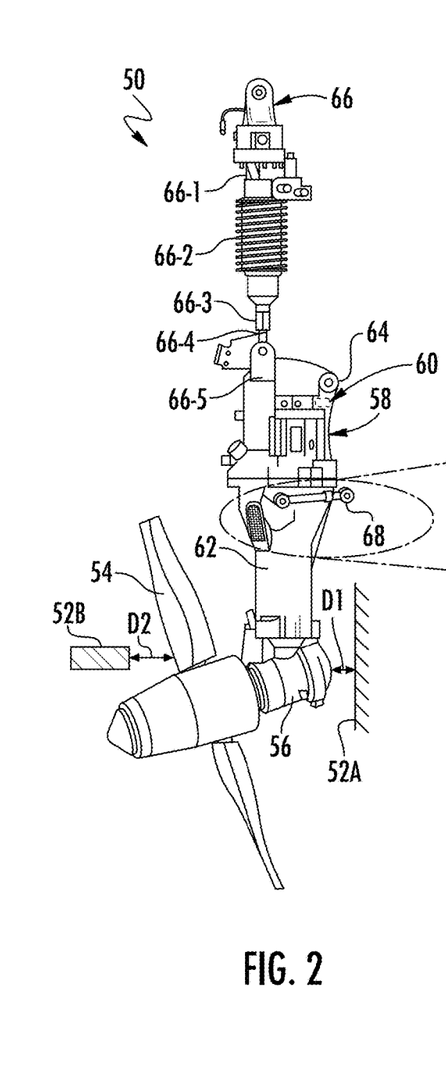
FIG. 2 is a perspective view of a ram air turbine (RAT) assembly where embodiments of the present invention can be implemented.

FIG. 2 is a perspective view of an embodiment of a RAT assembly 50, which can be mounted relative to one or more airframe elements 52A and 52B (illustrated schematically), and is deployable between a stowed position for storage when not in use and a deployed position to provide power (e.g., electric and/or hydraulic power). The RAT assembly 50 includes a turbine 54, a gearbox 56, a generator 58, a hydraulic pump 60 driven by a generator output shaft, a strut 62, a pivot post (or swivel post) 64, an actuator assembly 66, and a door linkage 68. Other components not specifically identified can also be included with the RAT assembly 50. The RAT 50 illustrated in FIG. 2 is shown merely by way of example and not limitation. Those of ordinary skill in the art will recognize that other RAT configurations are possible.

The assembly of the turbine 54 and the gearbox 56 are supported at the end of strut 62. The strut 62 is mounted relative to the airframe elements 52A and 52B with the swivel post 64, which allows pivotal movement of the turbine 54, strut 62, etc. The door linkage 68 can connect to a door, such that deployment of the RAT 50 simultaneously opens a door along aircraft fuselage. In one embodiment the airframe element 52A can be a door, and can be connected to the door linkage 68 to open when the RAT 50 is deployed. When the RAT 50 is stowed, clearance distances such as distances D1 and D2 are present between a portion of the RAT 50 and the airframe elements 52A and 52B, respectively. Because of non-linear spring rates of a spring that biases the airframe element 52A (when that element is a door), the clearance distance D1 may be somewhat unpredictable and in need of measurement and adjustment. It should be noted that particular clearance distances of interest will vary for particular applications, based on the particular configuration of the RAT 50 and the particular configuration of an installation location (for example, a RAT compartment space within an aircraft), for instance.

During flight, the turbine 54 can rotate responsive to air flow along the outside of the airframe (represented by elements 52A and 52B). Rotational power from the turbine 54 can be transmitted through the gearbox 56 to both the generator 58 and the hydraulic pump 60 for operation. The hydraulic pump 60 can be coupled to the generator 58 such that the hydraulic pump 60 rotates at the same speed as the generator 58. The actuator assembly 66 includes an actuator cylinder 66-1, a spring 66-2, an end housing 66-3, a rod 66-4, and an attachment structure 66-5. The actuator cylinder 66-1 can form a part of a hydraulic mechanism that can act as a shock absorber to control RAT movement during deployment, and/or provide other functions. The spring 66-2 can provide a biasing force to the RAT 50 in order to deploy the RAT 50 when a locking mechanism (e.g., locking pawl) is released (the locking mechanism is not specifically shown). The end housing 66-3 and the rod 66-4 are engaged to the cylinder 66-1, with the rod 66-4 connected to the attachment structure 66-5, which can be a clevis or yoke. The attachment structure 66-5 provides a fixed attachment for the body of the RAT 50 that includes the turbine 54, generator 58, pump 60 and strut 62, such that the body of the RAT 50 can pivot at the pivot post 64 in response to force applied by the actuator assembly 66.

Figure 3:
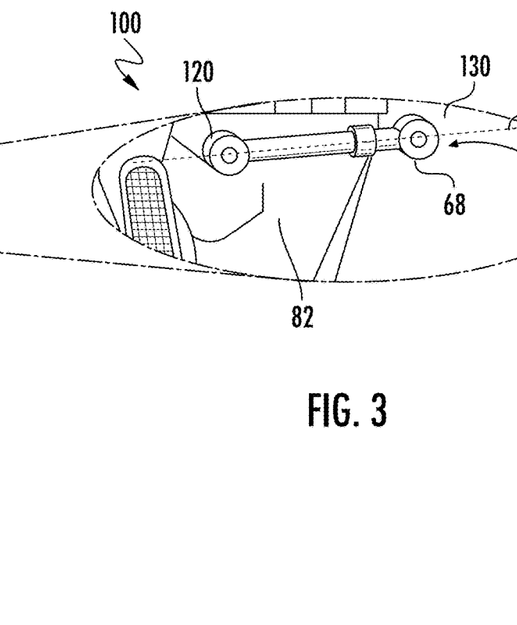
FIG. 3 illustrates a door linkage arm for a RAT where embodiments of the present invention can be implemented.
Figure 4:
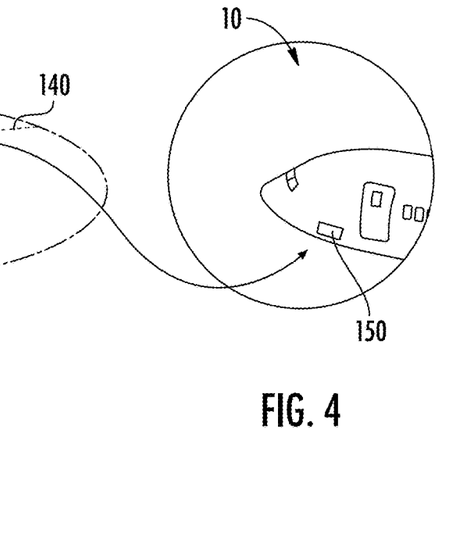
FIG. 4 illustrates a forward portion of the aircraft that includes a door for a RAT where embodiments of the present invention can be implemented.

Turing to FIG. 3, the door linkage 68 may comprise opposing ends 100 including a first end 120 and a second end 130 spaced along an axis 140 so that the first end 120 is a proximate end and the second end 130 is a distal end. The first end 120 may be configured for connecting to the strut 62 of the RAT and the second end 130 may be configured for connecting with a door 150 (FIG. 4) for enclosing the RAT 50 within the aircraft 10. Interchanging the connection features of the opposing ends 100 of the door linkage 68 is within the scope of the disclosed embodiments.

Figures 5, 6:
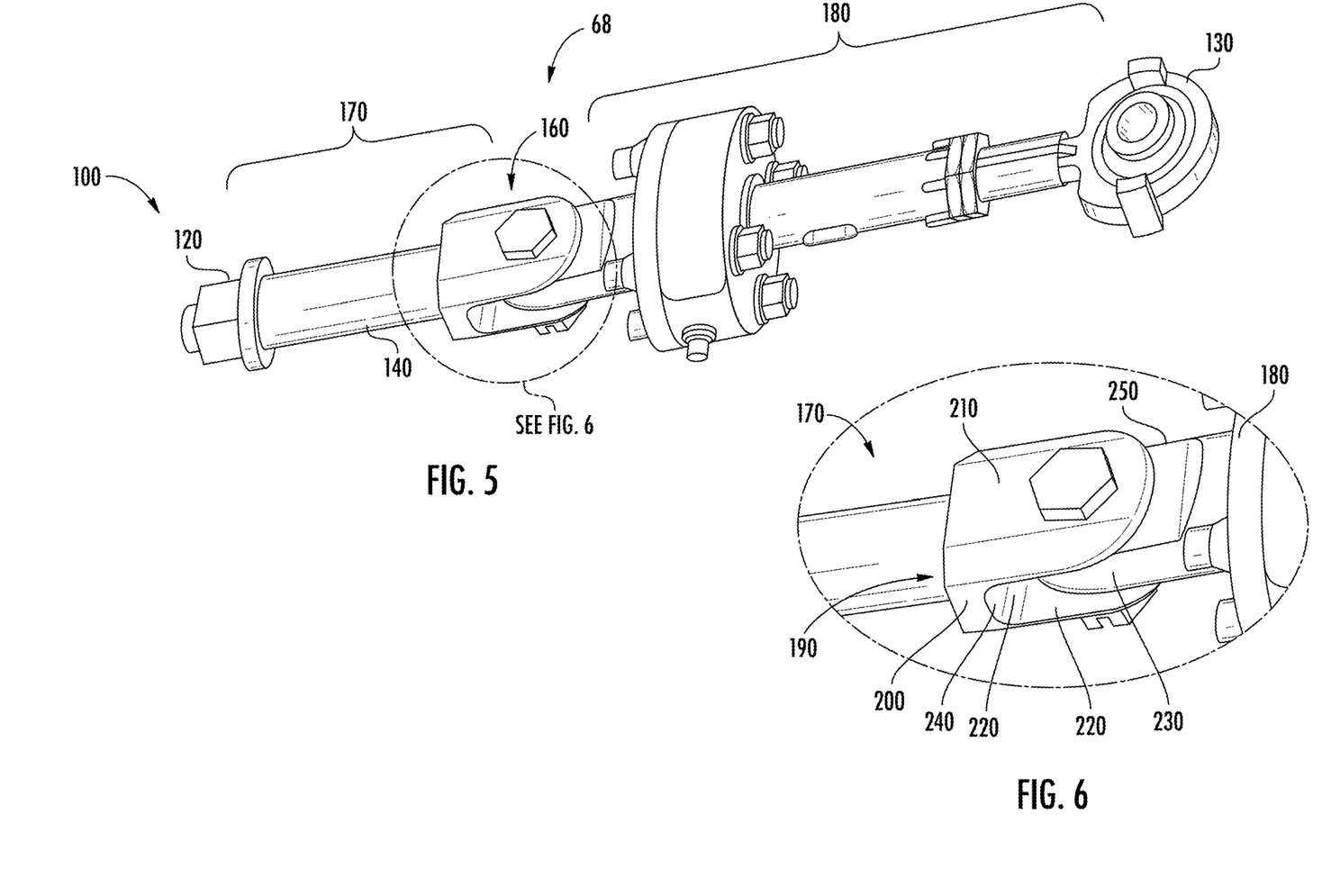
FIG. 5 illustrates various features of a door linkage arm for a RAT where embodiments of the present invention can be implemented.
FIG. 6 illustrates various features of a clevis connector for a door linkage arm for a RAT, and wherein embodiments of the present invention can be implemented.

Turning to FIG. 5, the door linkage 68 may include a clevis 160 between the opposing ends 100. A first portion 170 of the door linkage 68 may extend between the clevis 160 and the first end 120, and a second portion 180 of the door linkage 68 may extend between the clevis 160 and the second end 130. As illustrated in FIG. 6, a distal end 190 of the first portion 170 may form a clevis base 200 and clevis prongs 210 may extend distally from the clevis base 200. A clevis cavity 220 for receiving a clevis tang 230 may be formed between the clevis prongs 210. A clevis cavity apex 240 may be formed by a proximate end of the clevis cavity 220. A proximate end 250 of the second portion 180 of the door linkage 68 may form the clevis tang 230 that is rotatably contained within the clevis cavity 220.

Figure 7:
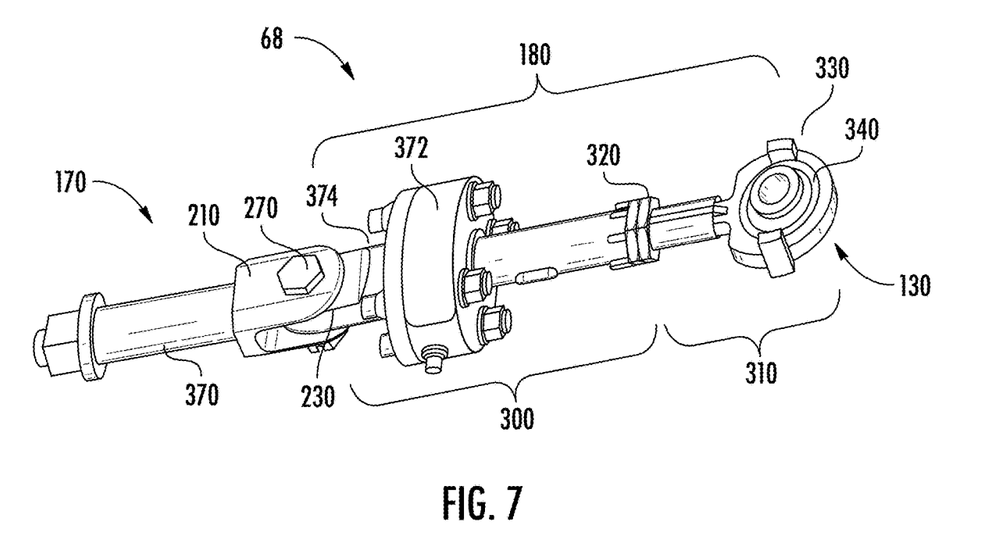
FIG. 7 illustrates further features of a door linkage arm for a RAT where embodiments of the present invention can be implemented.
Figure 8:
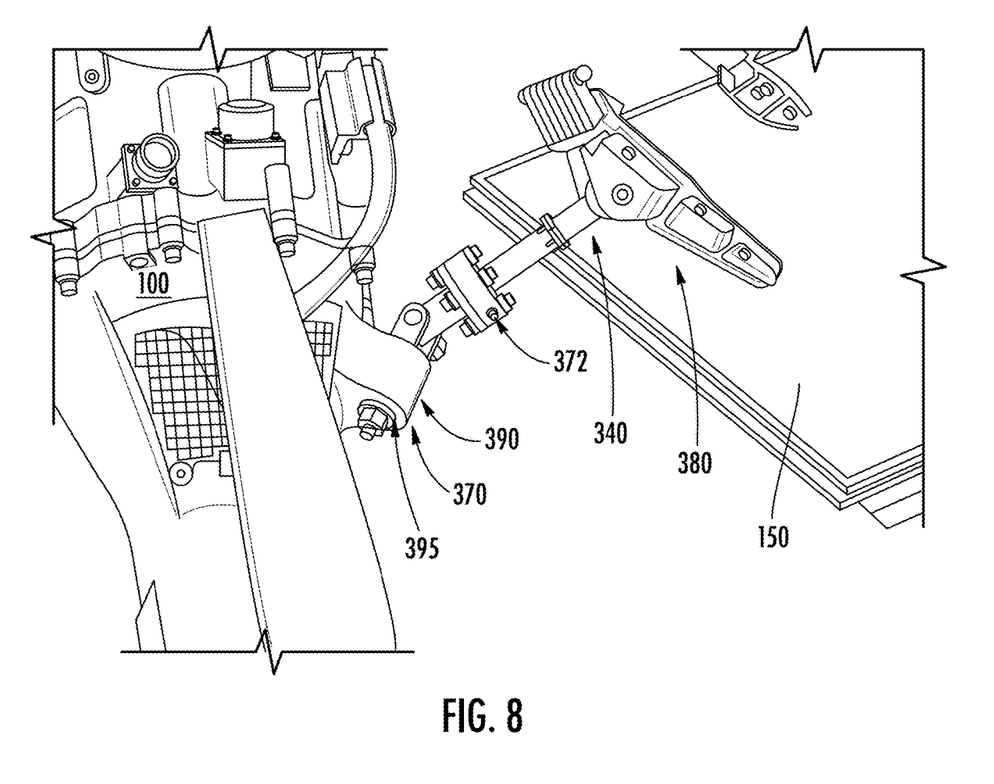
FIG. 8 illustrates a door linkage arm for the RAT connected between a RAT and a door, wherein the RAT is at least partially deployed, and wherein embodiments of the present invention can be implemented.

Additional features of the door linkage 68 are illustrated in FIG. 7. The clevis tang 230 may be secured to the clevis prongs 210 by a pin 270, which may be a bolt extending through holes in the prongs 210 and being secured thereto with a nut. The second portion 180 may be divided into a proximate part 300 and a distal part 310, with a rotational connection 320 therebetween. The distal part 310 may include the second end 130 which may be an eyelet 330 with a spherical bearing 340. The first portion 170 may be cylindrical and form a bushing 370. The proximate part 300 may include a dashpot 372 to absorb vibrational motion between the parts, and a proximate side 374 of the dashpot 372 may include the clevis tang 230. As illustrated in FIG. 8, the bearing 340 may rotatably connect within a door structural connector 380 and the bushing 370 may fit within a sleeve 390 within the strut 62. A mechanical stop 395 such as a plate with a diameter larger than the bushing may keep the bushing 370 within the sleeve 390. This configuration may allow for a rotatable connection between the strut 62 of the RAT 50 and the door 150.

The door linkage 68 as disclosed herein may create a connection between the RAT 50 and the door 150 for the RAT compartment in the aircraft 10. The door linkage 68 may provide the necessary degrees of rotational freedom to drive the door 150 for the RAT 50 as the door 150 opens during deployment and closes during stowing of the RAT 50.

Figures 9, 10, 11:
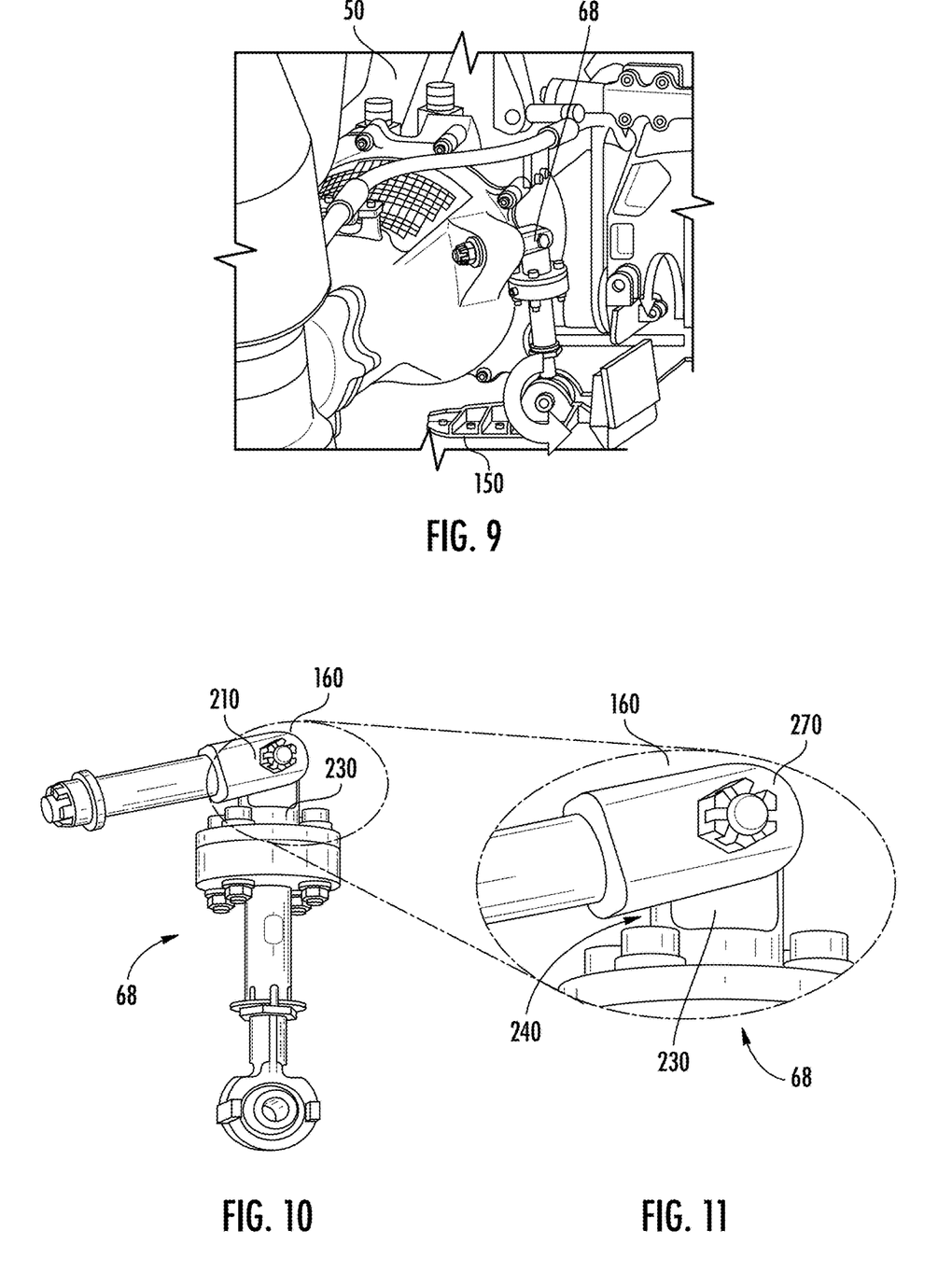
FIG. 9 illustrates a door linkage arm for the RAT connected between a RAT and a door, wherein the RAT is at least partially stowed, and wherein embodiments of the present invention can be implemented.
FIG. 10 illustrates a door linkage arm for a RAT, wherein the door linkage arm is oriented for a RAT that is at least partially stowed, and wherein embodiments of the present invention can be implemented.
FIG. 11 illustrates various features of a portion of a door linkage arm for a RAT, wherein the door linkage arm is oriented for a RAT that is at least partially stowed, and wherein embodiments of the present invention can be implemented.

FIG. 9 illustrates the RAT 50, the door linkage 68 and the door 150 in a configuration in which the RAT 50 is at least partially stowed. As illustrated in FIG. 10, with the door linkage 68 in a same orientation as with FIG. 9, the tang 230 and the clevis prongs 210 are oriented with an acute angle therebetween due to rotation about the clevis 160. This angular configuration is also possible during initial transportation of the door linkage 68 by human handlers, for example, prior to installation with the RAT 50, as well as during installation by human handler. However, during such activity, the door linkage 68 may experience unconstrained handling resulting in over-rotation of the parts because the door linkage 68, by itself, lacks rotational limiters.

As illustrated in FIG. 11, during unconstrained handling, when there may be over-rotation, the clevis cavity apex 240 may contact the clevis tang 230, resulting in damage to the clevis 160 components. Damage may include compression induced stress and strain, resulting in stress concentrations leading to potential fatigue to the tangs 230, clevis prongs 210 (FIG. 6), and other parts of door linkage 68. Embodiments herein may provide a motion limiter to reduce or eliminate such damage.

Figure 12:
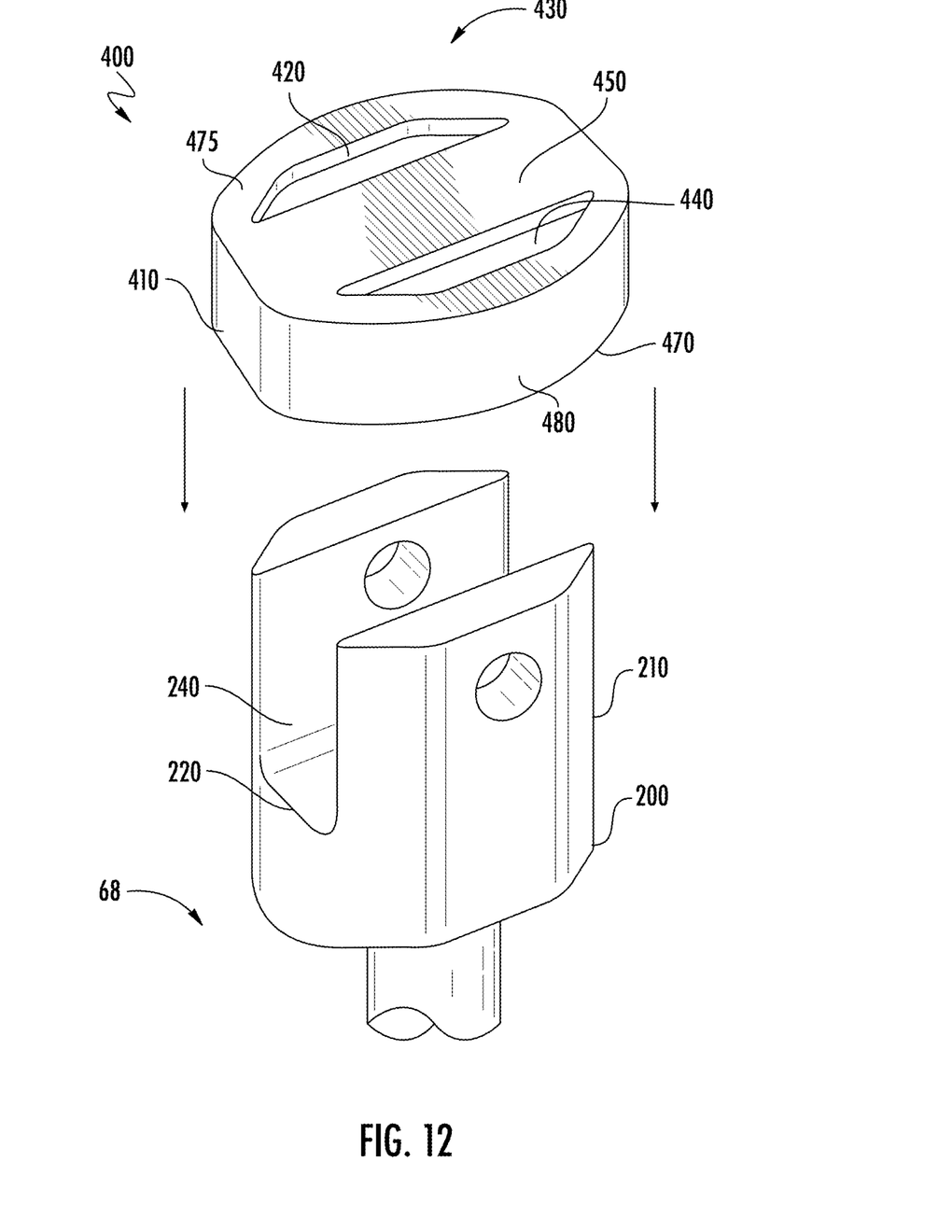
FIG. 12 illustrates a limiter being positioned on a portion of the door linkage arm according to an embodiment.

FIG. 12 illustrates a motion limiter 400 according to a disclosed embodiment. The motion limiter 400 installed into the door linkage 68 prior to full assembly and subsequent transportation reduces a possibility of over-rotation of the clevis during subsequent handling by human operators. The motion limiter 400 may engage the clevis cavity apex 240 to limit rotation of the tang 230 (not illustrated in FIG. 12) within the clevis cavity 220. The motion limiter 400 may comprise a block 410 and the block 410 may include a first opening 420. The block 410 may be configured for sliding over the clevis prongs 210 so that the clevis prongs 210 pass through the first opening 420. From this configuration, the block 410 may engage the clevis cavity apex 240, for example, the block 410 may come to rest at the clevis cavity apex 240. The block 410 may have a larger plan area than the clevis base 200 so that during over-rotation, the clevis tang 230 would engage the block 410 rather than the clevis cavity apex 240. The block 410 may be formed of a non-marring material so that damage to the clevis cavity apex 240 is prevented in the event that motion would otherwise lead to the tang 230 engaging the clevis cavity apex 240.

In one embodiment the first opening 420 in the block 410 is one of two openings 430, for example including a second opening 440. The openings 430 may be configured for respectively sliding over the clevis prongs 210. The openings 430 in the block 410 may form an elongated block web 450 therebetween. In one embodiment each of the openings 430 may have an inner surface profile that matches an outer surface profile of a respective one of the clevis prongs 210. In one embodiment the block web 450 engages the clevis cavity apex 240 when the block 410 is installed in the door linkage 68. In one embodiment an outer surface profile 470 of the motion limiter 400 is arcuate. In one embodiment a top surface 475 of the block 410 is shallow relative to an outer surface 480 so that when installed the outer surface forms a skirt that extends beyond the apex 240 over the tangs 230, for example, extending over the base 200. The size and shape of the block enables the door linkage 68 to operate without interference with the RAT 50 and the door 150. Thus, this configuration provides a motion limiter 400 that is intended to be permanently installed on the door linkage 68.

Figure 13:
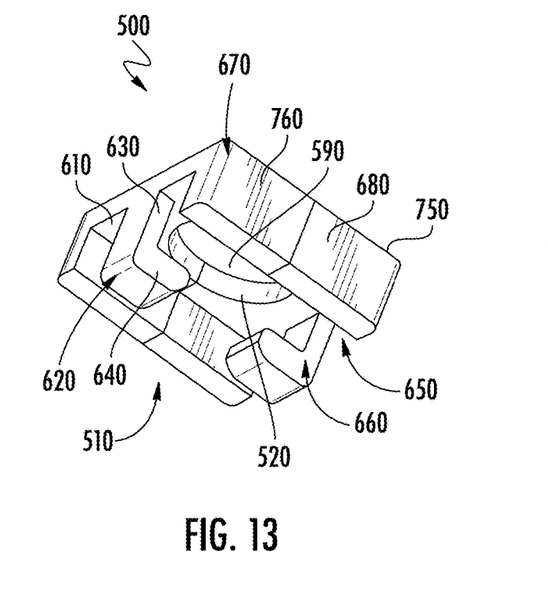
FIG. 13 illustrates features of a further limiter for the door linkage arm according to an embodiment.
Figure 14:
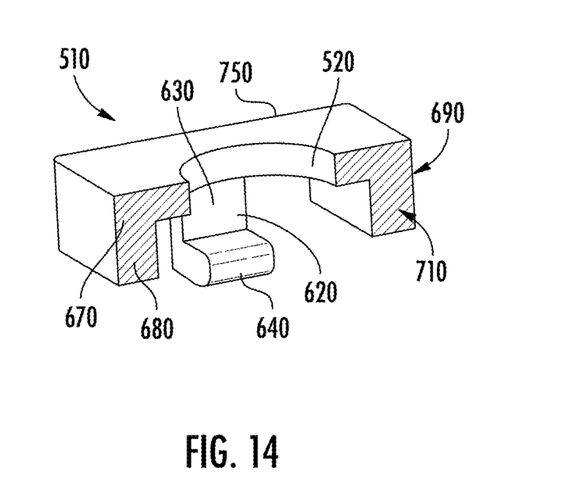
FIG. 14 illustrates additional features of the further limiter for the door linkage arm according to an embodiment.
Figure 15:
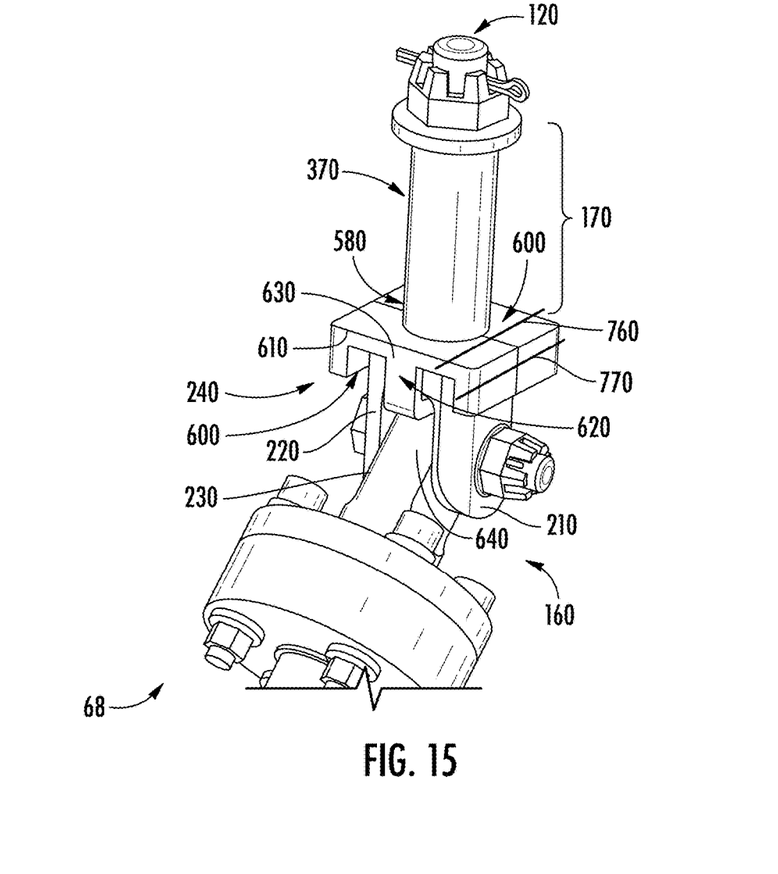
FIG. 15 illustrates the further limiter for the door linkage arm installed on the door linkage arm according to an embodiment.

Turning to FIGS. 13-15, another motion limiter 500 is illustrated, which may also engage the clevis cavity apex 240 to limit rotation of the tang 230 within the clevis cavity 220. The motion limiter 500 may include a block 510 with a first opening 520 configured for surrounding a first segment 580 of the first portion 170 of the door linkage 68 that is between the clevis 160 and the first end 120 of the first portion 170. For example, the first opening 520 is circular for surrounding the bushing 370.

In one embodiment the block 510 may include a distal side 590 that is positioned against a proximate side 600 of the clevis base 200. In addition, a first side surface 610 of the block 510 may include a first tab 620 that extends distally to engage the clevis cavity apex 240.

In one embodiment the first tab 620 is L-shaped having a first leg 630 that extends distally from the first side surface 610 of the block and a second leg 640 that extends perpendicularly to the first leg 630 so that the second leg 640 extends into the clevis cavity 220. In one embodiment the block 510 comprises a first pair of opposing side surfaces 650 that includes the first side surface 610, and a pair of tabs 660 that includes the first tab 620. In this configuration each of the tabs 660 may extend from a respective one of the first pair of opposing side surfaces 650 of the block 510 so that each of the tabs 660 may engage the clevis cavity apex 240.

In one embodiment the block 510 may include a second side surface 670 and a first support flange 680 that extends distally therefrom for engaging one of the clevis prongs 210. In one embodiment the block 510 comprises a second pair of opposing side surfaces 690 that includes the second side surface 670, and a first pair of support flanges 710 that includes the first support flange 600. In this configuration, each of the flanges 710 may extend from a respective one of the second pair of opposing side surfaces 690. With this configuration each of the flanges 710 may engage a respective one of the clevis prongs 210, for example, by being positioned against an exterior surface of the respective one of the clevis prongs 210.

In one embodiment the block 510 is segmented into a plurality of block pieces that includes a first piece 750 and a second piece 760, and the block 510 is held together by a connector 760 which may be a frangible connector that extends about the block 510. In one embodiment each of the plurality of block pieces 750 has a same shape. In one embodiment the block 510 is plastic, for example a lightweight plastic, and the frangible connector 760 is a plastic tie. In one embodiment the frangible connector 760 includes a plurality of frangible connectors 770 distributed about the block 510. This configuration provides a motion limiter that is intended to be removed at the time of installation, for example, by removing the plastic ties.

According to the above disclosure, incorporation of a motion limiter, which may be a light-weight, non-marring material, may provide a soft stop that may prevent the clevis tang of the door linkage from contacting the clevis cavity apex body of the door linkage during a potential over-rotation occurrence. Such occurrence, as indicated, may be during shipping and handling or during linkage installation when portions of the linkage are unsupported. The motion limiter may eliminate for example metal-to-metal contact that may otherwise result in contact damage on the clevis, extending to other parts of the door linkage. The motion limiter may therefore reduce repair costs to the door linkage and reduce time to manually install the door linkage by minimizing or removing a concern that the door linkage may be damaged from over-rotation.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An aircraft system comprising:
   a linkage comprising a first end, an opposing second end and a clevis therebetween;
   a motion limiter configured to engage the clevis; wherein:
     the first end is configured for connecting to one of a strut of a ram air turbine (RAT) and an enclosure door, and the second end being is configured for connecting with another of the strut and the door; and
     the motion limiter limits rotation between the first end of the linkage and the second end of the linkage;
   wherein:
     the first end of the linkage is a proximate end, and the second end of the linkage is a distal end;
     a first portion of the linkage extends between the clevis and the first end, and includes a clevis base, distally extending clevis prongs, a clevis cavity defined between the clevis prongs, and a clevis cavity apex at a proximate end of the clevis cavity; and
     a second portion of the linkage extends between the clevis and the second end, and includes a clevis tang; and
     the motion limiter engages the clevis cavity apex to limit rotation of the clevis tang within the clevis cavity; and
   wherein:
     the motion limiter comprises a block, the block including a first opening; and
     the block is configured for sliding over the prongs so that the prongs pass through the first opening and the block engages the clevis cavity apex.

2. The system of claim 1, comprising:
   two openings including the first opening;

wherein each of the two openings is configured for sliding over a respective one of the clevis prongs.

3. The system of claim 2, wherein each of the openings has an inner surface profile that matches an outer surface profile of a respective one of the clevis prongs.

4. The system of claim 3, wherein a block web is formed in a separation between the two openings, and the block web engages the clevis cavity apex.

5. The system of claim 1, wherein the motion limiter comprises a block, and the block includes:
   a distal side that is positioned against a proximate side of the clevis base, the distal side including an opening configured for surrounding a first segment of the first portion of the linkage that is between the clevis and the first end; and
   a first side surface and a first tab that extends distally from the first side surface to engage the clevis cavity apex.

6. The system of claim 5, wherein the first tab is L-shaped and has a first leg that extends distally from the first side surface of the block and a second leg that extends perpendicularly to the first leg so that the second leg extends into the clevis cavity.

7. The system of claim 6, wherein the block further comprises:
   a first pair of opposing side surfaces that includes the first side surface; and
   a pair of tabs that includes the first tab;
   wherein each of the tabs extends distally from a respective one of the first pair of opposing side surfaces of the block so that each of the tabs engages the clevis cavity apex.

8. The system of claim 7, wherein the block includes a second side surface, and a first support flange that extends distally from the second side surface for engaging one of the clevis prongs.

9. The system of claim 8, wherein the block further comprises:
   a second pair of opposing side surfaces that includes the second side surface; and
   a first pair of support flanges that includes the first support flange;
   wherein each of the flanges extends distally from a respective one of the second pair of opposing side surfaces, so that each of the flanges engages a respective one of the clevis prongs.

10. The system of claim 9, wherein each of the flanges engages the respective one of the clevis prongs by being positioned against an exterior surface of the respective one of the respective clevis prongs.

11. The system of claim 10, wherein the first segment of the first portion of the linkage is a bushing that is configured for being positioned within a channel in a strut for the RAT, and the first opening has an arcuate inner surface profile for surrounding the bushing.

12. The system of claim 11, wherein the block is segmented into at least two pieces and the at least two pieces are held together by a connector that extends about an outer surface of the block.

13. The system of claim 12, wherein each of the at least two pieces has a same shape.

14. The system of claim 13, wherein the connector is frangible.

15. The system of claim 14, wherein the connector includes a plurality of frangible connectors distributed about the block.

16. A method of configuring an aircraft system, comprising:
   obtaining a linkage for linking a ram air turbine (RAT) with a door for enclosing the RAT in an aircraft, wherein a first portion of the linkage is configured to be on a proximate side of a clevis and a second portion of the linkage is configured to be on a distal side of the clevis, and wherein the first portion and the second portion are disconnected from each other;
   obtaining a motion limiter for limiting relative rotation between the first portion and the second portion;
   sliding the motion limiter over clevis prongs formed on one of the first portion and the second portion until a block web of the motion limiter engages a clevis cavity apex formed between the clevis prongs; and
   connecting the first portion to the second portion so that a clevis tang formed on another of the first portion and the second portion is rotationally connected to the clevis prongs.

17. A method of configuring an aircraft system, comprising:
   obtaining a linkage for linking a ram air turbine (RAT) with a door for enclosing the RAT in an aircraft, wherein a first portion of the linkage is configured to be on a proximate side of a clevis and a second portion of the linkage is configured to be on a distal side of the clevis, and wherein the first portion and the second portion are connected to each other;
   obtaining a motion limiter for limiting relative rotation between the first portion and the second portion, the motion limiter comprising a plurality of same pieces; and
   assembling the plurality of pieces around the linkage to form the motion limiter having a single opening formed around a bushing in the linkage, and so that at least one tab extending from the motion limiter engages a clevis cavity formed between clevis prongs of the clevis.

18. The method of claim 17, comprising tying the assembled plurality of pieces together with at least one connector and thereafter removing the at least one connector to disassemble the plurality of pieces and remove the motion limiter from the linkage.

* * * * *